Jan. 16, 1940.    F. HODSON    2,187,348
FORMING COMPOSITE METAL BEARINGS
Original Filed March 17, 1936
Fig. 1,
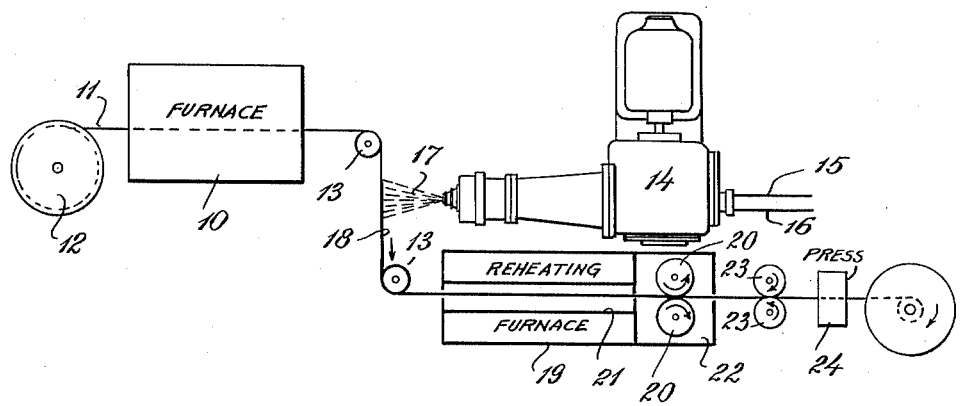
Fig. 2,
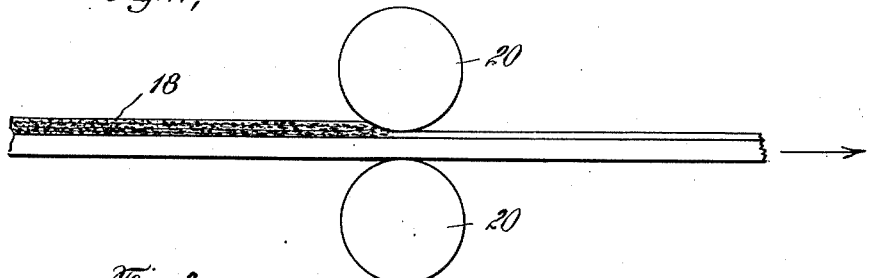
Fig. 3,
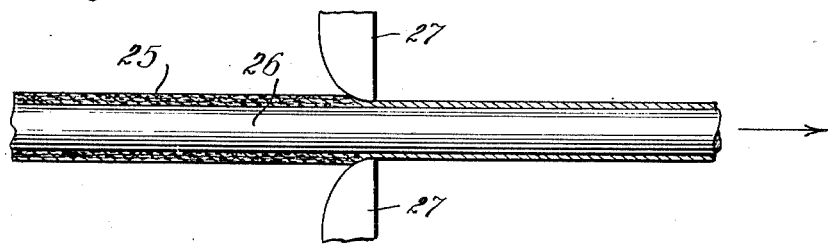
Fig. 4,
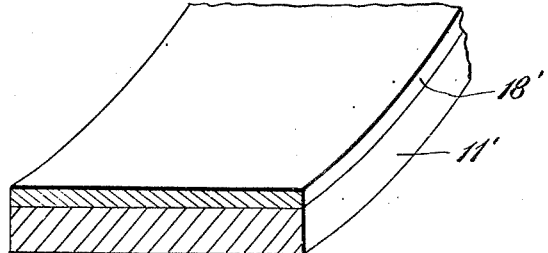
INVENTOR
Frank Hodson
BY
ATTORNEYS Patented Jan. 16, 1940

2,187,348

UNITED STATES PATENT OFFICE 2,187,348

FORMING COMPOSITE METAL BEARINGS

Frank Hodson, New York, N. Y.

Application March 17, 1936, Serial No. 69,271
Renewed June 2, 1939

4 Claims. (Cl. 29—149.5)

This invention relates to surfacing methods and materials and has particular reference to producing surfacing materials initially formed of spray-deposited metals or materials.

In copending application Serial No. 756,076, filed December 5, 1934, by Purling A. Bleakley, issued on September 7, 1937, as Patent No. 2,092,150, there are described a method and apparatus of depositing upon a suitable base a coating of metal or other material by spraying the same thereon in finely-divided molten, semi-molten or thermoplastic state. Also, in copending applications, Serial Nos. 63,587 and 63,588, both filed February 12, 1936, by Purling A. Bleakley, there are described a method and apparatus for forming composite structures of two or more materials by simultaneously spraying the materials upon a suitable base in finely-divided molten, semi-molten or thermoplastic state.

The spray-deposited structures formed according to the methods and with the apparatus disclosed in the said copending applications, have innumerable uses, whether the structures are formed of a single material or constitute a composite structure of two or more materials. In the former case the articles or base surfaces may be coated with a layer of a metal or material having rare, peculiar or specific properties, while in the latter case the structure is characteristic in that the two or more materials are deposited in distinct alternate layers, each comprising agglomerates of particles of one or the other of the initial materials containing dispersed inclusions of smaller proportions of the other materials. For example, this process provides a better and simpler method of mixing dissimilar materials which ordinarily can only be mixed with difficulty and only imperfectly with ordinary processes due to their physical or chemical characteristics. Thus, inasmuch as lead vaporizes at the melting point of copper, these metals cannot be alloyed or mixed mechanically by ordinary methods, whereas they can be intimately and thoroughly mixed according to the aforementioned method, without substantial loss of the lead, thus enabling the formation of bearing materials with these metals. Similar situations exist in respect to other dissimilar materials.

Owing to the origin of such spray-deposited structures, there are frequently minute voids between adjacent particles of the materials where the particles are not coextensively bonded together or to the base, probably because of the tendency of the molten, semi-molten or thermoplastic material particles to assume a spherical shape before they are deposited, although their impact with the base or previously deposited layer, due to their high velocity, materially reduces this tendency and consequently the size and number of such voids. These voids may impair the strength and wearing properties of a structure or surface so made, and gases are frequently entrapped or occluded in the voids, which although practically infinitesimal in volume, nevertheless may promote the breaking down of the structure such as a bearing, under high temperature and load conditions. Accordingly, the spray-deposited structure would be greatly improved for many purposes if the particles were coextensively adherent, so that the voids are eliminated, or reduced in number and size, and the bond much improved between the particles and between the spray-deposited material and the base.

In accordance with the present invention, a method of improving the physical strength and texture of thermally-sprayed structures of one or more initial materials by compacting the structure, is provided, this method rendering the structure especially adaptable for surfacing purposes such as for bearing liners, or as wear-resisting material, although the invention is not limited to these uses.

More particularly, the invention comprises simultaneously depositing by means of a spraying process, one or more metals or materials in finely-divided molten, semi-molten, or thermoplastic state, upon a surface or base and then mechanically working the resulting spray-deposited structure by means of pressure applied thereto by impact, rolling, drawing, or the like, in order to compact the same by closing any voids or pores therein, by more closely adhering the unbonded adjacent surfaces of the particles to each other and to the base, and by expelling any occluded gases. The compacting step may be performed while the material is cold or while it is heated to a temperature below the melting point thereof or one of the component materials, this heating step being conducted in air, or in a selected atmosphere. The surface of the spray-deposited structure may be prepared for the rolling or other compacting operation by planing, grinding, polishing, pickling, or otherwise removing the relatively rough skin or outer layer of the material, all depending upon requirements.

For a more complete understanding of the invention, reference may be had to the accompanying drawing, in which:

Figure 1 illustrates in plan the successive steps of heating a suitable base, simultaneously spray-depositing two metals upon the base, reheating the spray-coated base, and compacting by rolling the composite metal coating on the base;

Fig. 2 is an enlarged, exaggerated sectional view of the spray-coated base passing through the compacting rolls;

Fig. 3 is an enlarged, exaggerated sectional view of a spray-coated wire or rod being drawn through a draw plate; and Fig. 4 is a fragmentary perspective view of a bearing formed of the spray-coated base strip illustrated in Figs. 1 and 2.

Referring to Fig. 1, the first step may be an initial heating in furnace 10 of the base material 11, which is preferably in strip or band form and is drawn from a reel 12. This preheating is carried on at a relatively high temperature to promote the bonding of the spray-deposited material on the base strip 11, and may be conducted in a controlled atmosphere of hydrogen, nitrogen, butane, propane, illuminating gas, or the like, to reduce or tend to eliminate existing surface oxidation. Alternatively, the surface of the base strip 11 may be prepared for securing a good bond with the spray-deposited material by coating it with a suitable flux. For example, if the base strip 11 is of ferrous material, the flux may be aluminum oxide or alumina-forming mixtures, which is ignited by the hot metal spray and thus deoxidizes the surface of the base and prepares it for a good bond. Other "thermit" type fluxes may be used, and for non-ferrous metals the flux coating may be sal-ammoniac, borax, and the like, as is described in said copending application Serial No. 63,587.

With the base band or strip 13 so prepared, the next step comprises spraying in molten, semi-molten, or plastic state, by means of a high temperature, high velocity spray machine 14, such as is disclosed in said aforementioned copending applications or its equivalent, a finely-divided material or metal such as Babbitt, bearing bronze or the like, or a mixture of two or more materials, such as copper and lead, or alloys predominantly of copper and lead if bearing structures are to be made, although it is understood that the invention is not limited to that purpose, but the machine 14 may spray any material for any use. However, assuming, for illustration, that a copper-lead bearing is to be made, the machine simultaneously melts off the advancing ends of two wires or rods 15 and 16 of copper and lead, respectively, by means of an oxy-acetylene flame, or the like, and a high velocity current of a gas, preferably neutral or non-oxidizing, dessicates, mixes, and conveys the two metals in the form of a jet 17 for deposition upon the base 11 where the mixture cools. The thickness of the deposited composite structure 18, depends upon the rate of the relative movement between the machine 14 and the base 11, or upon the number of passes between the machine 14 and base 11 in order to build up numerous layers according to requirements.

The base 11 may be in the form of a band or strip of metal such as steel, copper, ferrous or non-ferrous alloys, or the like. Non-ferrous materials are preferred for bearing purposes, if they have the proper physical properties, because of their heat-conducting properties, providing rapid solidification of the spray-deposited materials and rapid heat conduction from the bearing in use. Beryllium copper alloy is an example of a preferred base material as well as spray-deposited bearing material. The base band or strip 11 is accordingly advanced at a predetermined rate over pulleys or rollers and the composite layer 18 deposited thereon by means of machine 14. It is then passed through a furnace 19 and heated therein by suitable means and fed in heated condition between rolls 20, which compact the structure to coextensively adhere the particles at the points where they are not bonded together and consequently eliminate the voids between them, thus securing a compacting of the structure 18 with the result that there is a coextensive contact between all particles constituting it, and between the particles thereof and the base 11, while the occluded gases are eliminated.

The heating of the spray-deposited layer 18 and strip 11 in furnace 19 may be conducted in air or in a selected or controlled atmosphere such as hydrogen, nitrogen, butane, propane, illuminating gas, or the like, within tube 21, and the rolling or compacting operation may be carried out in such atmosphere within closed chamber 22. In this way the composite structure 18 may be treated in a non-oxidizing atmosphere to prevent surface oxidation and to tend to eliminate existing surface oxidation. Uniform heating in furnace 19 in a controlled gaseous medium is also facilitated.

In order to facilitate the rolling or other compacting operation, the surface of the spray-deposited layer 18 may be dressed by planing, grinding, polishing, or otherwise removing the relatively rough outer layer at a point between the spray machine 14 and the rolls 20. Polishing rolls 23 rotating in a direction opposite to the direction of travel of strip or band 11 may be provided for polishing the upper and lower surfaces of the finished strip 11. Bearings may then be stamped, pressed, or otherwise formed from strip 11, as is indicated in Fig. 4, where 11' indicates the base, and 18' the composite metal liner. A press is indicated at 24.

As is indicated more or less schematically in Fig. 2, the aforementioned laminated composite metal deposit structure 18 or base band or strip 11 is rolled by rolls 22 in the direction of the length of the laminae and the laminae are compacted parallel to the surface of the base 11. The precise arrangement of the laminae of such composite spray-deposited structure 18 is illustrated in said copending application Serial No. 63,587. It will be understood that the spray-deposited particles, whether all of the same initial material or of a mixture of two or more initial materials, are flattened, because of their impact, in a direction substantially parallel to the surface of the base, and that the compacting operation is performed in the direction of the length of the flattened particles.

Instead of depositing the material or materials on a flat surface, the spray-deposited coating 25 may be formed on a wire or rod or tube 26 and this coating 25 simultaneously compacted and dressed by drawing the coated rod or wire 25 through a draw plate 27, either while it is hot or cold, depending upon requirements. The spray-deposited coating 25, which may be applied spirally by rotating the rod or wire 26 as it advances past the spray machine 14, is thus compacted into a homogeneous mass, which is devoid of voids and occluded gases, and the flattened particles of which are compacted in the direction of their lengths. The wire or rod may be preheated in a furnace like 10, or coated with a flux of the form described, and may be reheated before drawing in a furnace such as 19 in the presence of a suitable gas.

Although compacting of the spray-deposited structure has been described herein as performed by rolling or drawing, it is to be understood that it may be performed by means of presses, dies, hammers, punches, etc., and may be conducted while the material is hot or cold and the heat may be applied externally as described, or it may be induced internally by electric current, and the like. Also, although the making of a bearing has been particularly described herein, it is to be understood that the invention is not limited to that use but is susceptible of innumerable other uses within its scope. Although bearing metals of all sorts may be spray-deposited and compacted in the manner described, it has been found that beryllium copper alloy (predominantly copper) is admirably adapted for bearing material, either alone or in mixture with lead or lead alloys or the like.

I claim:

1. The method of making a bearing, which comprises depositing a finely-divided spray of initially solid material in thermoplastic state on a base, heating the solidified material and the base in a non-oxidizing atmosphere applying pressure to the material-coated base while in said atmosphere to compact the material on the base, and forming the material-coated base into a bearing.

2. The method of making a bearing, which comprises directing a spray of thermoplastic particles of an initially-solid material upon a base with sufficient impact to elongate the particles substantially parallel to the base, rolling the solidified material in a direction substantially parallel to the base to compact it on the base, and forming the material-coated base into a bearing.

3. The method of making a bearing, which comprises directing a spray of thermoplastic particles of a material upon a base with sufficient impact to elongate said particles in a direction at an angle to the direction of the spray, applying pressure to the solidified material at an angle to the direction of said particle elongation to compact it on the base, and forming the material-coated base into a bearing.

4. The method of applying bearing material to a base, which comprises spraying the material in finely-divided thermoplastic state upon the base, heating the resulting composite structure of the solidified material on the base in a non-oxidizing atmosphere, and rolling the said structure while in said atmosphere to compact the material on the base.

FRANK HODSON.